United States Patent [19]

Akins

[11] Patent Number: 4,815,369
[45] Date of Patent: Mar. 28, 1989

[54] INJECTION OF WRAPPED BALE WITH ANHYDROUS AMMONIA

[76] Inventor: Edward A. Akins, Box 158, St. Boniface, Winnipeg, Manitoba, Canada, R2H 3B4

[21] Appl. No.: 942,179

[22] Filed: Dec. 16, 1986

[30] Foreign Application Priority Data

Sep. 10, 1986 [GB] United Kingdom ............... 8621830

[51] Int. Cl.⁴ .................. A23K 1/00; A23K 1/22
[52] U.S. Cl. ............................. 99/533; 53/111 RC; 53/431; 53/587; 99/534; 100/45; 100/73
[58] Field of Search .................. 99/532–534, 99/535, 516, 431, 111 RC; 53/118, 211, 461, 465, 587, 593, 399, 341; 426/69, 281, 335, 626, 636, 807; 100/73, 45, 88; 414/24.5

[56] References Cited
U.S. PATENT DOCUMENTS

| | | |
|---|---|---|
| 3,793,798 | 2/1974 | Lancaster . |
| 3,818,674 | 6/1974 | Tull . |
| 3,867,806 | 2/1975 | Lancaster . |
| 4,050,220 | 9/1977 | Lancaster . |
| 4,050,221 | 9/1977 | Lancaster . |
| 4,064,276 | 12/1977 | Conradsen et al. . |
| 4,077,179 | 3/1978 | Lancaster . |
| 4,079,565 | 3/1978 | Lancaster . |
| 4,110,957 | 9/1978 | Lancaster . |
| 4,281,500 | 8/1981 | Mueller . |
| 4,450,178 | 5/1984 | Korsgaard ............... 99/533 X |
| 4,453,460 | 6/1984 | Rabe et al. ............... 99/533 X |
| 4,606,172 | 8/1986 | Miller . |
| 4,622,892 | 11/1986 | Corominas ............... 99/533 X |

FOREIGN PATENT DOCUMENTS

| | | |
|---|---|---|
| 1000606 | 11/1976 | Canada . |
| 1009137 | 4/1977 | Canada . |
| 1018490 | 10/1977 | Canada . |
| 0111434 | 6/1984 | European Pat. Off. . |
| 2056401 | 3/1981 | United Kingdom . |
| 1591638 | 6/1981 | United Kingdom . |
| 8205993 | 3/1982 | United Kingdom . |
| 8314925 | 5/1983 | United Kingdom . |
| 2185174A | 7/1987 | United Kingdom . |

Primary Examiner—Timothy F. Simone
Attorney, Agent, or Firm—Stanley G. Ade; Adrian D. Battison; Murray E. Thrift

[57] ABSTRACT

Baled animal feed material is improved by being moved onto a vehicle either by a lifting mechanism at the side of the vehicle or by a platform which takes the bale directly from a baler. On the vehicle is firstly mounted a wrapping station in the form of a cradle which rotates the bale about its axis and about an axis at right angles to the bale so that the plastic strip material is wrapped around the bale and around the ends of the bale. A probe is moved forwardly hydraulically to enter the bale along its axis following which anhydrous ammonia from a volumetric measuring device is injected under pressure from a hydraulic supply through the probe into the bale.

11 Claims, 5 Drawing Sheets

INJECTION OF WRAPPED BALE WITH ANHYDROUS AMMONIA

BACKGROUND OF THE INVENTION

This invention relates to the improvement of baled animal feed material.

In recent years techniques have become available for wrapping a cylindrical bale with plastics material so as to maintain that bale against deterioration by weather effects. The wrapping process has taken various techniques including bagging and wrapping of the bale with a strip material. These techniques are achieving some success but at present the techniques and machinery available is relatively simple and crude merely providing a machine for the actual wrapping with other processing and handling of the bale being carried out by conventional techniques in an unsatisfactory manner.

One example of a machine of this type is disclosed in British patent application No. 2159489 (Eight Milieu). A further example is shown in European Publication No. 0110110. Both of these devices are concerned merely with wrapping the bale and use a technique in which the bale is gradually rotated about its axis while it is also wrapped in a direction parallel to the axis or in the plane of the axis so that the strip of wrapping material extends around the ends of the bale.

This general technique was initially disclosed in relation to cylindrical objects of a different nature in U.S. Pat. No. 1,654,258.

Further devices of this general type are shown in U.S. Pat. Nos. 4,569,439, 4,409,784, 4,407,113, 4,343,132, and 4,296,595. Yet further devices are shown in Canadian Pat. No. 1086630 and German patent application Nos. 2705101 and 3311279.

A device for the injection of lye, for example ammonia, into a bale through a hollow spike mounted on a bale carrier from a tank carried by the tractor is shown in U.S. Pat. No. 4,450,178. This patent therefore suggests that a wrapped bale during its transportation can be injected by a spike which is carried by the transportation mechanism. This is, however, a highly unsatisfactory procedure and has not met with any commercial success.

SUMMARY OF THE INVENTION

It is an object of the present invention, therefore, to provide an improved method and apparatus for handling and processing of baled feed material in which there is significant improvement to the baled product and also to provide improved process ergonomics.

According to a first aspect of the invention, therefore, there is provided a method of improving a baled animal feed material comprising placing a bale of the material at a wrapping station, wrapping the bale with an impervious material such that the bale is completely enveloped and, at one point during the period commencing immediately prior to the commencement of the wrapping and terminating immediately after completion of the wrapping, injecting the bale with a fluid chemical material.

The injection therefore takes place generally during the wrapping operation or process and thus avoids repeated handling of the bale. Preferably the injection takes place while the bale is at the wrapping station and part way through the wrapping process so that displaced air has a chance to escape from the bale while the majority of the bale is wrapped to reduce escape of the injected material. In addition, the completion of the wrapping can be arranged to automatically cover the point on the bale surface where the injection probe penetrated.

According to a second aspect of the invention, there is provided a vehicle for use in improving baled animal feed material comprising a frame having ground wheels for moving the frame across the ground, a wrapping station mounted on the frame, means mounted on the frame at the station for wrapping the bale with an impervious material so as to envelope the bale, means mounted on the frame for moving the bale to the wrapping station and means mounted on the frame for injecting the bale with a fluid chemical material.

According to a third aspect of the invention, there is provided an apparatus for injecting a bale with anhydrous ammonia comprising a probe, means mounting the probe such that an end of the probe can enter the bale, a tank arranged to contain anhydrous ammonia under pressure, a cylinder, first duct means connecting the cylinder to the tank, second duct means connecting the cylinder to the probe, first and second valve means arranged each in their respective duct means and operable to close the respective duct means, a piston movable within the cylinder so as to vary the volume of the cylinder, means for halting the piston at variable positions within the cylinder such that the piston can be moved to receive within the cylinder a predetermined variable quantity of said anhydrous ammonia from said first duct means, and means for moving the piston to expel the anhydrous ammonia through said second duct means to the probe.

The invention has a first advantage, therefore, that the bale can be processed by a single machine which acts to lift the bale onto a wrapping station, commence the wrapping process, inject the bale with the anhydrous ammonia or other chemical product, complete the wrapping process and deposit the bale.

Preferably the amount of the injected anhydrous ammonia is controlled in dependence of the accurately measured weight of the bale which is measured during the lifting process. The amount of the anhydrous is preferably controlled by a volumetric control device which uses the pressure of the ammonia to feed the material into a cylinder and to halt that feed when the volume reaches the required amount by halting movement of a piston within the cylinder. The piston can then be forced out of the cylinder preferably hydraulically to dispense that measured amount of the material through a probe into the bale.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
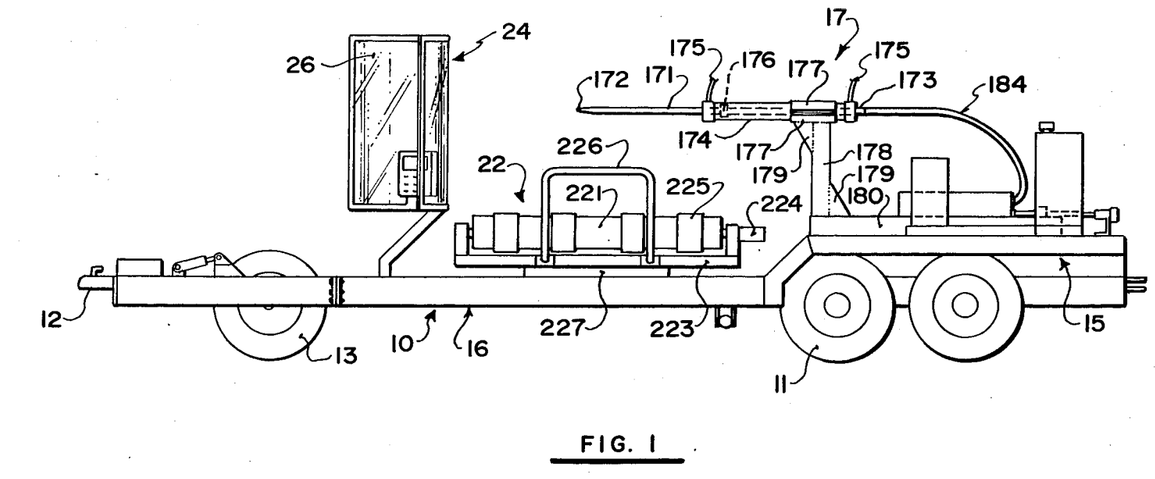
FIG. 1 is a side elevational view of a trailer incorporating one embodiment of the present invention.
Figure 2:
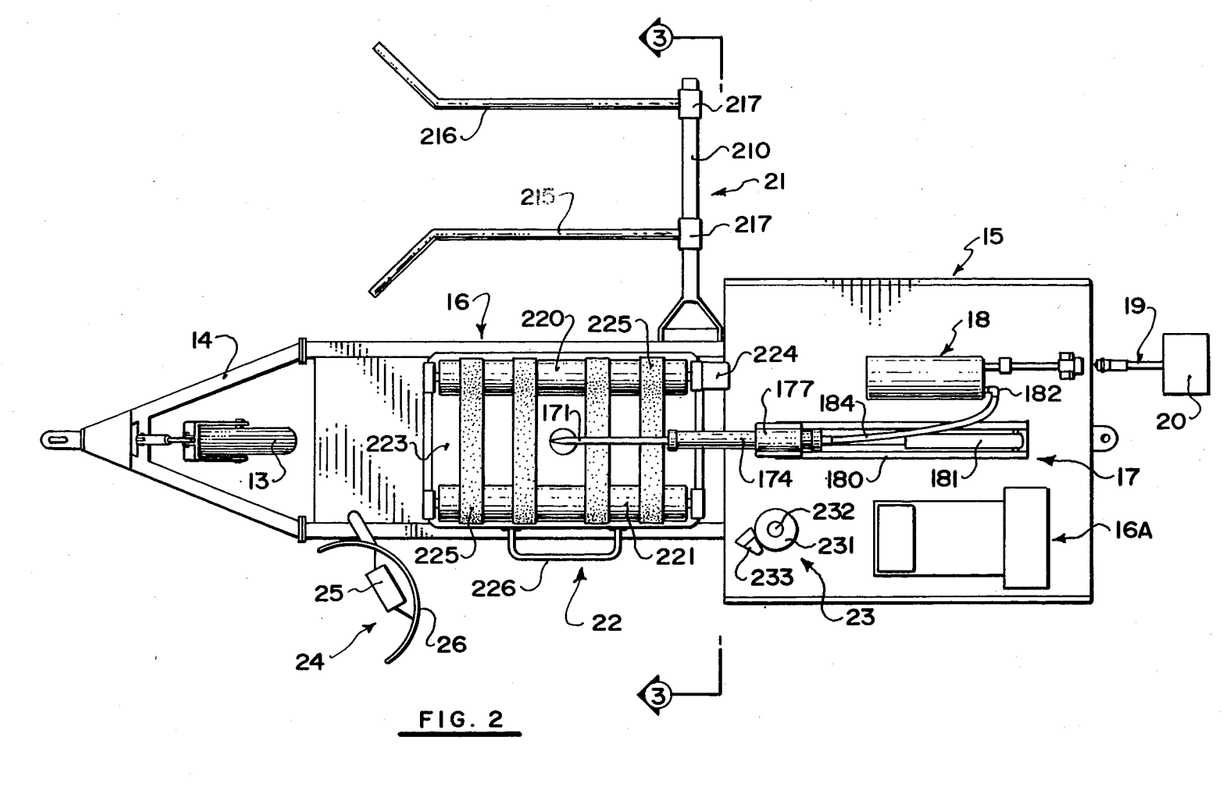
FIG. 2 is a top plan view of the trailer of FIG. 1.
Figure 3:
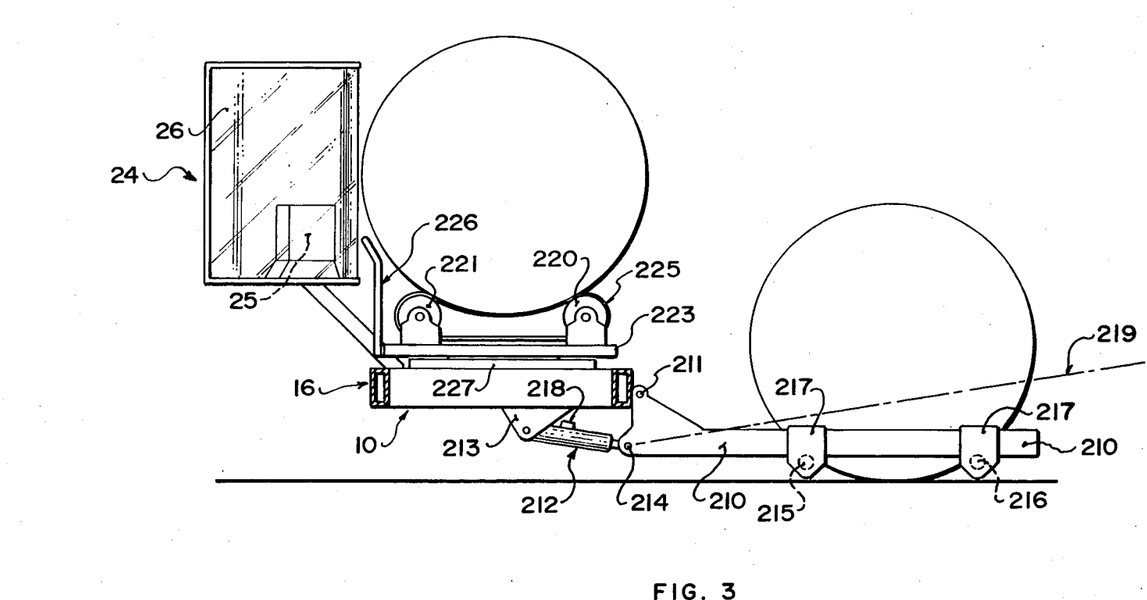
FIG. 3 is a cross-sectional view along the lines 3—3 of FIG. 2 with the probe retracted and hence not visible.

The apparatus as shown in FIGS. 1, 2 and 3 comprises a conventional flatbed semi-trailer 10 which includes a frame for supporting the various components and ground wheels 11 by which the trailer can move across the ground towed upon a hitch 12. For purposes of reducing the weight upon the hitch, an additional caster wheel 13 can be added at a front end of the vehicle between the inwardly inclined hitch arms 14 as best shown in FIG. 2.

The frame includes a rear platform 15 and a forward section 16 on which the various parts of the apparatus are mounted. The rear platform carries a drive motor 16A with the necessary hydraulic pumps to generate hydraulic power for the equipment, as described hereinafter. In addition, the platform 15 carries a probe 17 and a measuring device 18 for anhydrous ammonia to be supplied from a supply pipe 19 from a trailed tank schematically indicated at 20.

The central section 16 carries a lift mechanism generally indicated at 21 for grasping and lifting a bale onto a winding station 22 upon which a bale can be wrapped from a supply 23 of a plastics strip material. An operator station 24 is positioned adjacent the central section 16 and contains a central processor 25 which controls the operation of the device as explained hereinafter, together with a screen 26 which shields the operator from the process.

The lifting mechanism 21 is best shown in FIGS. 2 and 3 and includes an outwardly extending strut 210 which is pivotally mounted upon the frame 16 on a hinge mechanism 211. The strut can be raised and lowered by a hydraulic ram 212 which is coupled to the frame on a bracket 213 and pivotally coupled to the strut 210 at a link point 214.

The strut 210 carries two forwardly extending arms 215 and 216 which are arranged to lie closely adjacent the ground when the strut extends directly outwardly to the side of the frame. In addition, the arms are arranged parallel to the direction of motion of the trailer and include outwardly canted forward ends so that a bale engaged by the arms tends to be centred so that its axis lies parallel to the arms and above the arms with the arms spaced by a distance less than the diameter of the bale so that it can be lifted by the arms as the strut 210 is pivoted in an anti-clockwise direction. The arms 215 and 216 are attached to the strut 210 by collars 217 which can be adjusted in position to accommodate different sized bales.

The hydraulic ram 212 receives hydraulic fluid on a pressure side via a transducer device 218. Normally this device is inoperative and allow the hydraulic ram merely to raise and lower the strut 210 from the ground position as shown to a raised position in which the bale rolls from the lifting device onto the winding station 22. However, the central processor 25 is arranged to control the ram 212 so that it is halted in its movement with the strut 210 lying on a line 219. In this position, with the ram halted, the transducer 218 detects the pressure in the fluid in the ram which is proportional to the weight resting upon the ram from the strut 210 and arms 215, 216 together with the weight of the bale, which is accordingly measured. The signal from the transducer 214 is transmitted to the processor 25 to give an indication of the weight of the bale.

The winding station 22 comprises a pair of rollers 220 and 221 which are mounted for rotation on suitable bearing mounts provided on a platform 223. A motor 224 is mounted on one of the rollers to provide a driving force to that roller which is communicated between the rollers by straps 225 which are wrapped around the rollers and form a cradle between the rollers for supporting the bale at the winding station. A stop rail 226 is mounted on the platform at one side so that a bale deposited onto the rollers from the lift mechanism is halted in its rolling movement so that it remains seated on the rollers with its axis parallel to the rollers for wrapping. The platform 223 is mounted on a turntable support 227 which can thus rotate the whole platform including the rollers about a vertical axis which is at right angles to the horizontal axis of the bale.

Wrapping of the bale is carried out similarly to the arrangement shown in British patent application No. 2159489. Specifically, a supply of the strip of impervious plastics material in the form of a roll 231 is mounted upon a vertical rod 232. A tensioning system 233 allows the material to be drawn from the roll and applies tension thereto. The details of the tensioning system are not shown. The rod 232 and tensioning system 233 are fixedly mounted adjacent to the wrapping station but spaced therefrom sufficiently so that they cannot contact the bale as it rotates. The rate of rotation of the bale on the cradle defined by the bands 225 and the rollers 220 and 221 relative to the rate of rotation of the turntable about the vertical axis is controlled so that basically the strip is wrapped around the bale parallel to the axis of the bale and in a plane containing the axis while the bale is gradually rotated so that the next adjacent strip is offset from the previous strip by approximately 75% of the width of the strip. This technique is more clearly described in the British Application.

When wrapping of the bale is complete, the bale can be dropped from the wrapping station by lifting of the turn table support 223 about a pivot axis on the side of the frame remote from the lifting device so that the bale can roll onto the ground. Preferably the platform is rotated to a point where the support strut 26 lies adjacent the lifting device as the bale is rolled off.

The probe 17 comprises a hollow tube 171 which has a sharpened point at a forward end as indicated at 172 with axial openings in the sharpened point to allow material in the hollow tube to exit into the bale when the probe is forwarded to a position shown in FIGS. 1 and 2 where the probe is inside a bale positioned on the wrapping station. A check valve (not shown) can be provided in the end of the probe so that the material inside the probe only escapes when the material is under sufficient pressure to open the check valve thus preventing any remnants from gradually leaking from the probe when the probe has been removed from the bale.

The tube 171 extends from the forward end 172 to a rearward end 173 to which is attached a flexible hose 184. The elongate tube 171 passes through a cylinder 174. The cylinder has two hydraulic supply lines 175 each connected at a respective end for supplying hydraulic fluid under pressure to the interior of the cylinder for acting against a piston 176 carried on the exterior of the hollow tube 171. It will be appreciated, therefore, that supply of hydraulic fluid under pressure to the lefthand end of the cylinder as shown in FIG. 1 will cause the piston 176 to move toward the right and thus retract the probe into the position shown in FIG. 5.

The cylinder 174 is carried in a collar 177 which is mounted upon a vertical stand 178 including bracing plates 179. The stand 178 can slide forwardly and rearwardly within a track 180 mounted upon the rear platform 15 under actuating force supplied by a hydraulic ram 181. Thus the probe can be retracted into the position shown in FIG. 5 in which it is fully removed from the area of the wrapping station to a forward position as shown in FIGS. 1 and 2 in which the sharp end of the probe 172 is approximately at the centre of a bale carried at the wrapping station. Thus it will be noted that the height of the probe is arranged such that it is substantially along the axis of the bale and, in addition, in the forward position the end is approximately halfway along the cradle defined at the wrapping station.

Figure 4:
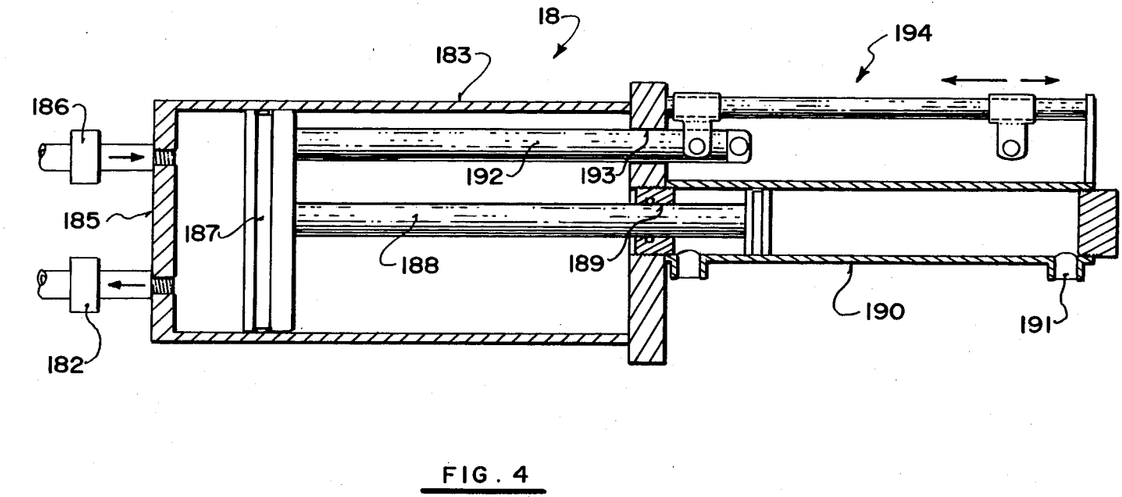
FIG. 4 is a cross-sectional view on an enlarged scale of the measuring and injecting device of FIGS. 1 and 2.

The flexible hose 184 connects to an outlet valve 182 of the measuring device 18. The measuring device is best shown in FIG. 4 and comprises a cylinder 183 which includes an end cap 185 which has openings therein for connection to the outlet valve 182 and an inlet valve 186 (both shown schematically).

The cylinder 183 has mounted therein a piston 187 mounted upon a rod 188 which can slide axially along the cylinder so as to vary the volume of the cylinder on the forward side of the piston. The end of the rod 188 passes through an opening 189 in an opposed end cap of the cylinder into a subsidiary cylinder 190 mounted upon the end of the first cylinder 183. A hydraulic inlet and outlet valve is indicated at 191 for communicating fluid to and from the subsidiary cylinder 190. A rod 192 is carried by a rear face of the piston 187 for sliding through an opening 193 in the opposed end cap for cooperation with an proximity sensor 194. The rod 192 carries suitable markings or projections which enable its position to be detected by the proximity sensor 194.

In operation of the measuring device 18, a flexible hose 19 from the tank 20 is connected to the inlet valve 186. The tank 20 is of a type which is reinforced to receive anhydrous ammonia under the conventional pressure which is sufficient to maintain the ammonia liquid. In addition, the pressure in the tank 20 is sufficient to expel liquid from the tank through the line 19 in conventional manner so that when the valve 182 is opened under control of the processor 25, the pressure causes the piston 187 to move away from the end cap 185 so as to increase the volume of the cylinder presented to the liquid. The rod 192 moves with the piston 187 with its position, thus the position of the piston 187 detected by the proximity sensor 194. The processor 25, subsequent to the weighing of the bale, as previously explained, calculates the required volume of material to be injected into the bale and thus the required position of the piston 187. When the rod 192 thus reaches its required position, the escape of hydraulic fluid through the valve 191 is halted so that the further movement of the piston 187 is prevented. The valve 191 also acts as a restrictor so that the movement of the piston is sufficiently slow that it can be halted at the required position without excessive overrun because of any delays in the system.

When the required volume of the liquid is within the cylinder 183, the valves 182 and 186 are switched under control of the processor 25 so that no more fluid can be supplied to the cylinder 183 following which hydraulic pressure can be applied to the valve 191 to eject the piston 187 and thus force the liquid material through the outlet 182 to the probe 171.

The use of the volumetric control ensures that an accurate volume of liquid is supplied to the probe regardless of the exterior temperature which can otherwise affect flowtype measuring systems. In addition, the use of the piston 187 as a measuring device and as a powered ejection device ensures that the liquid can be passed into the probe 171 at a sufficiently high rate that the injection can be carried out in a reasonable time even when the exterior temperature is very low thus reducing the natural pressure of the liquid. It will be appreciated that, in order to keep the process of wrapping and injection to a minimum, it is desirable that the injection can be carried out within a required short period of time of the order of 30 seconds regardless of any exterior circumstances. The use of the hydraulic pressure on the volumetric control achieves this. In addition, when the liquid is fully expelled from the cylinder 183 by the forward movement of the piston 187, the pressure in the liquid is removed so that the check valves (not shown) can close to prevent any further escape of the liquid when the probe is withdrawn from the bale.

The wrapping process is commenced prior to injection by the probe 171. Thus when a bale has been lifted by the lifting mechanism onto the wrapping station, wrapping is commenced by the manual or automatic attachment of the impervious plastic sheet to the bale preferably around one of the twine strands. The rotation of the bale is then commenced and the bale wrapped to a position leaving approximately 20% (preferably in the range 10-25%) of the bale exposed. Rotation of the bale is then halted by the processor 25 so that the axis of the bale is aligned with the probe 171 and with the plastics material remaining attached to the bale. At this point the probe is forwarded by hydraulic supply to the ram 181 and to the cylinder 174 to take up its position approximately centrally of the bale and on the axis of the bale. Injection is then completed with the bale stationary.

Injection of the material with the bale partly but not wholly wrapped acts to leave an area for air to escape from the bale as it is displaced by the injected material but inhibits the escape of the material.

The probe is then withdrawn and the winding or wrapping of the bale recommenced by rotation of the platform and the cradle. The wrapping is then completed until the whole of the bale is covered by the plastics material with the wrapping completed when the final wrap overlaps the initial wrap. This, of course, provides a large number of surface layers over the end of the bale at the axis so that the hole caused by the puncturing of the previously laid wraps by the probe 171 is fully covered by further wraps which extend over the axis of the bale.

When the wrapping is complete, the strip material can be tied off either manually or automatically and the bale dumped onto the ground.

Figure 5:
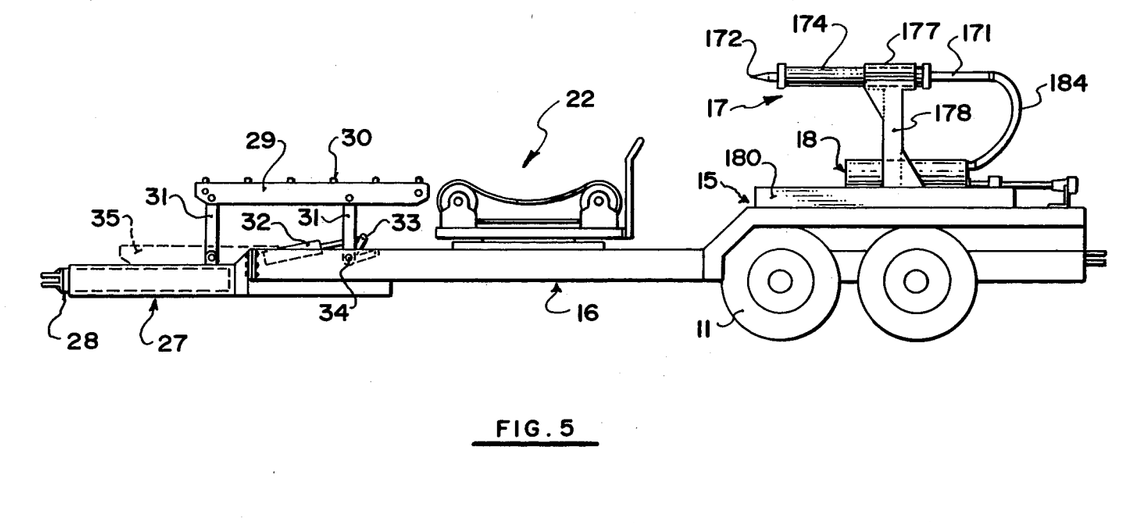
FIG. 5 is a side elevational view of the device of FIG. 1 with the probe in a retracted position and with a front end of the device modified for use of the vehicle behind a baler.

Turning now to FIG. 5, basically the same construction of trailer is shown except that the lifting mechanism 21 is omitted. In its place and in the place of the hitch portion 14 and ground wheel 13 of the trailer of FIGS. 1 and 2 is provided an attachment hitch 27 for attachment behind a baler (not shown). The attachment hitch 27 includes an extendable tongue 28 which can move the trailer forwardly and rearwardly relative to the rear of the baler. In addition, the hitch 27 includes a platform 29. The platform 29 includes a chain conveyor 30 which can be rotated or driven along the length of the platform so as to move the bale on the platform rearwardly onto the winding station 22. In addition, the platform is mounted upon parallel levers 31 so that it can be raised into the position shown in FIG. 5 from a lowered position by a ram 32 which operates on a lever 33 attached to a shaft 34 carrying one of the levers 31.

In the lower position in which the platform is shown in dotted line 35, with the extendable tongue 28 fully retracted, the platform lies beneath the rear outlet of the baler so that a bale expelled from the baler drops directly onto the platform in its lower position 35. When the bale is properly positioned on the platform, the tongue 28 can be extended to move the trailer and the platform rearwardly relative to the baler. In this rearward position, there is sufficient room to allow the platform to be raised into the position shown in FIG. 5 for deposit of the bale onto the wrapping station 22. A weight-measuring transducer is provided on the platform 29 at a suitable location either using the hydraulic pressure technique on the valve 32 or using simple load cells on the connection between the platform and the levers 31. The operation of the device shown in FIG. 5 is substantially the same as previously described except that the platform is rotated through 90° as shown in FIG. 5 so that the bale rolled from the platform 29 onto the cradle is carried out with the axis of the bale in the right direction relative to the cradle.

The present arrangement can also be used for injection of other fluid chemical materials into the bale which have a chemical effect (including microbiological effect) on the bale to provide improvement. The improvement obtained may be in terms of the metabolic energy levels, protein levels, mineral content and digestibility or other improvement. Anhydrous ammonia has an improvement effect on many of the above items and particularly the digestibility since it tends to separate the lignin from the cellulose content of the baled material.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A vehicle for use in improving a bale of animal feed material comprising a frame having ground wheels for moving the frame across the ground, a wrapping station mounted on the frame, means on said frame for engaging a bale on the ground adjacent the vehicle and for lifting the engaged bale from the ground onto the wrapping station, the wrapping station comprising a pair of parallel spaced rollers arranged to receive the bale thereon and to rotate the bale about a horizontal axis of the bale, means mounted on the frame at the station for wrapping the bale with an impervious material so as to envelope the bale, said wrapping means comprising a supply of impervious material having a width less than an axial length of the bale and means for causing relative movement of the bale and the supply to wrap the material around the bale as it is rotated by the rollers, means mounted on the frame for injecting the bale with a fluid chemical material, said injecting means comprising a probe mounted on the frame for movement relative thereto from a position spaced from the bale to a position in which the probe enters an exterior surface of the bale for injecting said material therein, means for sensing the weight of the bale and means for measuring the quantity of chemical material injected into the bale in dependance upon the weight of the bale, and means for ejecting the bale from the wrapping station.

2. The invention according to claim 1 wherein the wrapping means includes means for rotating the bale and means for feeding a strip of the impervious material such that the strip is wrapped around the bale as it rotates and wherein there is provided a halting means for halting the wrapping process during the wrapping process such that the injection of the chemical material can take place while the bale is halted partly through the wrapping process. to enter the bale from an face of the bale.

3. The invention according to claim 1 including a turntable for rotating the bale about an axis at right angles to its axis and means for halting said turntable in an orientation such that an end face of the bale is presented toward said injecting means.

4. The invention according to claim 1 wherein said injecting means comprises a tank arranged to contain anhydrous ammonia under pressure, a cylinder, first duct means connecting the cylinder to the tank, second duct means connecting the cylinder to the probe, first and second valve means arranged each in their respective duct means, a piston movable within the cylinder so as to vary the volume of the cylinder, means for halting the piston at variable positions within the cylinder such that the piston can be moved to receive within the cylinder a predetermined variable quantity of said anhydrous ammonia from said first duct means, and means for moving the piston to expel the anhydrous ammonia through said second duct means to the probe.

5. The invention according to claim 4 wherein said piston is freely movable under pressure from said anhydrous ammonia with said first valve means open such that the cylinder is filled by pressure within the tank.

6. The invention according to claim 4 wherein movement of said piston in a direction to receive said anhydrous ammonia within the cylinder causes movement of a hydraulic fluid and wherein said halting means is arranged to halt the flow of said hydraulic fluid to prevent further movement of said piston and wherein said means for moving the piston comprises means for moving said hydraulic fluid in a direction reverse to said movement thereof to force the piston to expel said anhydrous ammonia.

7. The invention according to claim 6 including means for sensing the position of the piston and for halting flow of said hydraulic fluid when said piston reaches a predetermined position.

8. The invention according to claim 1 wherein said injecting means comprises a probe in the form of an elongate hollow tube and means for moving the tube longitudinally from a position exteriorally of the bale so that an exposed end of the probe enters the bale, said moving means comprising a cylinder surrounding said tube, a piston mounted on said tube and slideable along said cylinder and means for supplying hydraulic fluid to said cylinder so as to move said piston longitudinally of the cylinder.

9. The invention according to claim 8 wherein said cylinder is mounted upon a carriage movable longitudinally of the probe.

10. The invention according to claim 7 wherein said means for moving the bale comprises a pair of spaced, parallel arms arranged to engage beneath a cylindrical bale with the spacing between the arms being less than the diameter of the bale such that the arms can be moved parallel to the axis of the bale on either side of a vertical plane containing the axis and beneath a horizontal plane containing the axis, and a strut member extending outwardly to one side of said vehicle and mounting said arms thereon such that they extend in a direction parallel to a direction of motion of the vehicle, said strut means being pivotally mounted on said vehicle so as to raise said arms to roll said bale onto the wrapping station.

11. The invention according to claim 1 wherein said vehicle comprises a trailer for mounting rearwardly of a baler, said vehicle including means for attachment of the vehicle to the baler, said means being arranged for movement of the vehicle forwardly and rearwardly relative to the baler and means for lifting a bale when ejected from the baler onto the vehicle and arranged such that ejection of the bale with the vehicle moved forwardly causes the bale to fall onto the lifting means and such that with the vehicle moved rearwardly, the lifting means is freed to lift the bale upwardly for movement to said wrapping station.

* * * * *